United States Patent [19]

Weiblen

[11] Patent Number: 4,679,406
[45] Date of Patent: Jul. 14, 1987

[54] HEAT-INSULATING WINDOW

[76] Inventor: Rolf-Diether Weiblen, Eltener Strasse 1, D-4330 Mülheim/Ruhr, Fed. Rep. of Germany

[21] Appl. No.: 669,841

[22] Filed: Nov. 9, 1984

[30] Foreign Application Priority Data

Nov. 17, 1983 [DE] Fed. Rep. of Germany ....... 3341485
Feb. 22, 1984 [EP] European Pat. Off. ........ 84101824.5
Jul. 28, 1984 [EP] European Pat. Off. ........ 84108985.7

[51] Int. Cl.⁴ .............................................. F25D 23/12
[52] U.S. Cl. ..................................... 62/262; 62/259.1; 52/171; 126/431
[58] Field of Search .................. 126/431, 439; 62/262, 62/259.1; 49/63, 64; 160/107; 237/2 B, 1 R; 52/171

[56] References Cited

U.S. PATENT DOCUMENTS 4,180,942  1/1980  Saucier ........................... 49/63 X
4,232,821  11/1980 Backlund ......................... 237/2 B
4,294,038  10/1981 Davidson ......................... 52/171
4,347,835  9/1982  Seemann ........................... 126/431

FOREIGN PATENT DOCUMENTS

636361  12/1978  U.S.S.R. .................. 160/98

Primary Examiner—Henry A. Bennet
Attorney, Agent, or Firm—Birch, Stewart, Kolasch & Birch

[57] ABSTRACT

An auxiliary frame (10) mounted in the wall hole (33) of a building comprises at its outside an external facing frame (14) and at its inside an inner facing frame (15) which include respective window casements. The space inside the installation frame (10) is divided into a window chamber (11) and an auxiliary chamber (12) separated by a partition wall (13). The auxiliary chamber (12) contains rollers (28) to unwind curtain webs (29) which may enter through slots (27) of the partition wall (13) into the window chamber (11) to form there subdivided air chambers. Beneath the window chamber (11), another auxiliary chamber (45) is available to receive an air conditioner with air humidifier, air filter, heat exchanger, blower and a heating- and/or cooling system.

12 Claims, 14 Drawing Figures

HEAT-INSULATING WINDOW

The invention relates to a heat-insulating window for buildings, comprising a facing frame delimiting a window opening and being insertable into a wall hole, at least one glass pane being provided in the window opening.

A high percentage of heat loss in buildings has been experienced in the window region. On the other hand, windows also act as solar collectors by allowing incident heat radiation to pass and to be converted into heat inside the building.

It has been known to mount at a window a heat-insulating curtain comprising several curtain webs which are unwound from rolls to form air chambers extending in parallel to the window and in which stationary air cushions may be produced. Such a curtain formed of several air chambers may be spread e.g. by night to prevent heat present in the building from getting out at the glass panes of the building. The curtain may be wound up when sun shines so that heat may radiate freely into the building. The known heat-insulating curtains which are fitted separately behind a window require an independent support construction that will be mounted separately from the window, inside the building.

It is the object of the invention to provide a heat-insulating window of the above type which comprises an integrated curtain structure and the assembly of which, from the building viewpoint, is simplified.

To solve the problem, the invention provides that the window frame is secured to an installation frame connected with the wall and containing behind the window opening a window chamber and outside the window chamber an auxiliary chamber supporting several rolls on which curtain webs are wound that may be unwound into the window chamber.

The installation frame of the heat-insulating window of the invention is firmly mounted in an opening of the external building wall. At said installation frame, the facing frame is fastened subsequently to secure thereto firmly either the glass pane or a casement carrying the glass pane and adapted to be opened. Thus, the installation frame is intended to house the heat-insulating curtain, on the one hand, and to mount the window frame which may be simply fitted at the installation frame e.g. by previously provided fixture elements. By this means, involved assembly works for mounting the heat-insulating curtain or the window frame are avoided. The assembly frame is a prefabricated element which, on the part of the builder, is incorporated into the wall structure and to which all remaining window elements may be secured subsequently. In a way, the installation frame is integrated into the wall of the building, and, generally, it does not project from the wall inside or outside. If the curtain webs are wound up, incident light may freely pass through the window chamber. If the curtain webs are unwound, the window space is divided by the curtain webs into several air chambers in which steady air is present as a heat-insulating means. Thus, heat insulation is very effective without requiring additional space within the window range except for the auxiliary chamber in which the rolls are located. Said auxiliary chamber being inside the wall does not reduce the useful volume of the building.

Preferably, the auxiliary chamber is separated from the window chamber by an intermediate wall, comprising slots for the passage of the curtain webs. The upper ends of the air chambers are closed by the intermediate wall thus inhibiting or at least restricting to a far extent the air exchange of the air chambers.

Conveniently, the window chamber is delimited towards the building inside by at least one further glass pane which may be mounted in an inner casement fitted at another facing frame which is secured to the installation frame. Thus, the access to the window chamber is ensured from the building inside in order to open the casement of inner and outer window to admit fresh air. The window chamber is closed preferably in all round. Due to the installation frame, an inner and an outer window may be mounted which inner and/or outer window may extend over the total height of the installation frame. If one casement is opened, not only the window chamber but also the auxiliary chamber will be opened as well. Therefore, by opening one casement only, a simple access is offered to the auxiliary chamber in view of maintenance or cleaning purposes. On the other hand, a look into the auxiliary chamber shall not be possible from the building inside so that it is advisable to provide for the inner wing frame a non-transparent shield within the range of the auxiliary chamber.

To obtain tight air chambers and to avoid air circulation between the latter, it is provided that the side walls of the installation frame comprise vertical guide slots which are engaged by the borders of the curtain webs. The installation frame may also include a bottom wall with slots for the engagement of the lower borders of the curtain webs. By this means, the individual air chambers are closed air-tightly to a far extent when the curtain webs are unwound.

According to a preferred embodiment of the invention, a further auxiliary chamber to receive air conditioning and control devices is provided beneath the window chamber. In this case, the installation frame extends nearly to the floor. The transparent window range beginning only in parapet height, the space beneath the window chamber is available as an auxiliary chamber in which drive assemblies, control devices, conditioning instruments, heat exchangers, air humidifyers etc. may be installed. Further, the external wall of the additional auxiliary chamber may be designed as a solar collector collecting heat from solar radiation and/or from ambient air of the building to transmit it into the building inside. Said solar collector is also mounted at the installation frame or at the block case and need not be secured directly at the building wall or brickwork. It is also possible to house in the further cavity for inst. a chemical heat reservoir.

Usually, conventional window frames are anchored by hooks in the wall holes. As a result, broad gaps being left around window must be filled with an insulating foam to be plastered subsequently. Due to the defective insulation in said sites, heat losses may occur and, moreover, the wall holes frequently do not comply with the dimensions provided in the architectural drawings.

It is, therefore, a further object of the invention to provide a heat insulating window of the foregoing type which, by improving heat insulation around the frame, also contibutes to simplifying assembly on the part of the builder and to reducing manufacturing costs of the building.

To solve said problem it is provided, according to the invention, that the facing frame of the external window is fixed at a block case inserted in the wall opening.

With the wall structure element of the invention, the block case may be incorporated upon putting up a floor or an intermediate ceiling and prior to erecting the walls of a building. Thus, a high dimensional accuracy may be realized for the incorporation of the block case in the brick system and heat losses such as caused by a subsequent mounting of windows in wall holes because of joints or defective joint seals are avoided. The battering of walls at window openings and the fitting of windows in window apertures being unnecessary, considerable cost may be saved for the manufacture of a building. Moreover, constructional errors such as wall openings not true to the design as to the mounting dimensions are practically excluded, because the block case predetermines the dimensions of the wall holes. Thereafter, the facing frame is fastened at the block case. Then, either the glass pane is secured to the former, or a casement adapted to support the glass pane and to be opened will be provided. The block case is a prefabricated element which is incorporated by the builder in the wall structure in view of fixing thereto all the other members of the window. In other words, the block case is an element integrated with the wall of the building and as a rule, it does not project inwardly or outwardly from the wall.

In one embodiment of the invention, there is provided at the upper block case end above a window chamber behind the window aperture a box comprising a first auxiliary chamber, the box housing at least one roller for curtain webs which are broader than the facing frame, and which may be unwound towards the window space, the underside of the box including an intermediate wall having slots for the passage of the curtain webs and guiding elements for spreading the individual curtain webs.

Advantageously, the box for the curtain webs may be mounted in brickwork by reducing the joint width to a minimum, thus excluding within the range of the roller shutter casing the unretentive points regarding heat losses usual with conventional construction.

The intermediate wall separating the first auxiliary chamber from the window chamber contains slots for the passage of curtain webs. The upper ends of air chambers formed in the window chamber by spreading the curtain webs are closed by the intermediate wall thus restricting considerably or inhibiting the air exchange of the air chambers. If the curtain webs are wound up, incident light may freely enter the room. On the other hand, if the curtain webs are unwound, the window space is divided by the curtain webs into several air chambers, in which steady air is present at a heat-insulating means. Thus, heat insulation is very effective without requiring additional space within the window range except for the box housing the rolls and being mounted inside the wall thus not reducing the useful volume of the building. The curtain webs being broader than the facing frame of the external window improve heat insulation with the range of the window frame accordingly.

At the block case and/or near the vertical side faces confining the window chamber, there are fitted vertical guide profiles engaged by the edges of the curtain webs. At the lower end of the window opening, there are horizontal end profiles in which the lower edges of the curtain webs disappear in unwound condition.

By guiding profiles of the slot type, tight air chambers are realised and air circulation between the air chambers is inhibited in that the edges of the curtain web engage the slots of the guide profiles. Due to horizontal end profiles mounted at the window opening end, the engagement of the lower edges of the curtain webs preferably containing loading reails, is ensured thus causing a nearly air-tight closure of the individual air chambers when the curtain webs are unwound.

Preferably, the guide profiles are of the plug type combinable subject to the number of curtain webs. Thus, a simply and quick assembly of the guide profiles is possible.

Towards the building, the block case may contain projecting vertical side walls and a horizontal bottom or ceiling wall.

By this means, plastering of the front faces of the external wall pointing to the window opening may be neglected, the external wall being brickes nearly as far as to the side walls.

According to a preferred embodiment, an installation frame enclosing at least the window chamber is provided to secure thereto the guide profiles and end profiles and to connect therewith the block case.

The installation frame is a prefabricated element which may be fixed subsequently at the block case. Thus, upon the mounting of the block case, the total bar brickwork including plastering may be finalised first prior to mounting the installation frame which is meant to receive the curtains in the window chamber and to house air conditioners etc. in the second auxiliary chamber. The completely equipped installation frame may be connected subsequently e.g. by a plug connection with the block case. As a result, assembly works at the building site may be disregarded to a far extent, it being possible to outfit the installation frame in an economic manner for inst. in a conveyer-line production. Due to the subsequent mounting in the final phase of a building schedule, expensive elements of the building cannot be damaged or stolen when the building is still unfinished.

The intermediate wall including the curtain webs and rollers is provided preferably as a module which may be quickly mounted subsequently in the box.

Some embodiments of the invention will be explained hereinafter in more detail with reference to the drawings.

Figure 1:
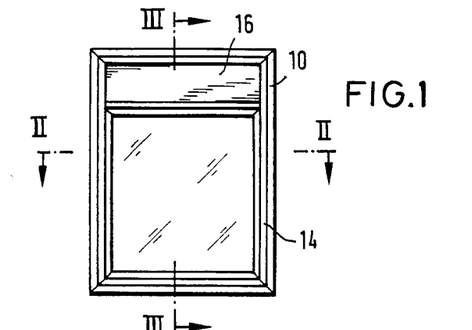
FIG. 1 is a schematic view of a heat insulating window from the outside of the building.
Figure 2:
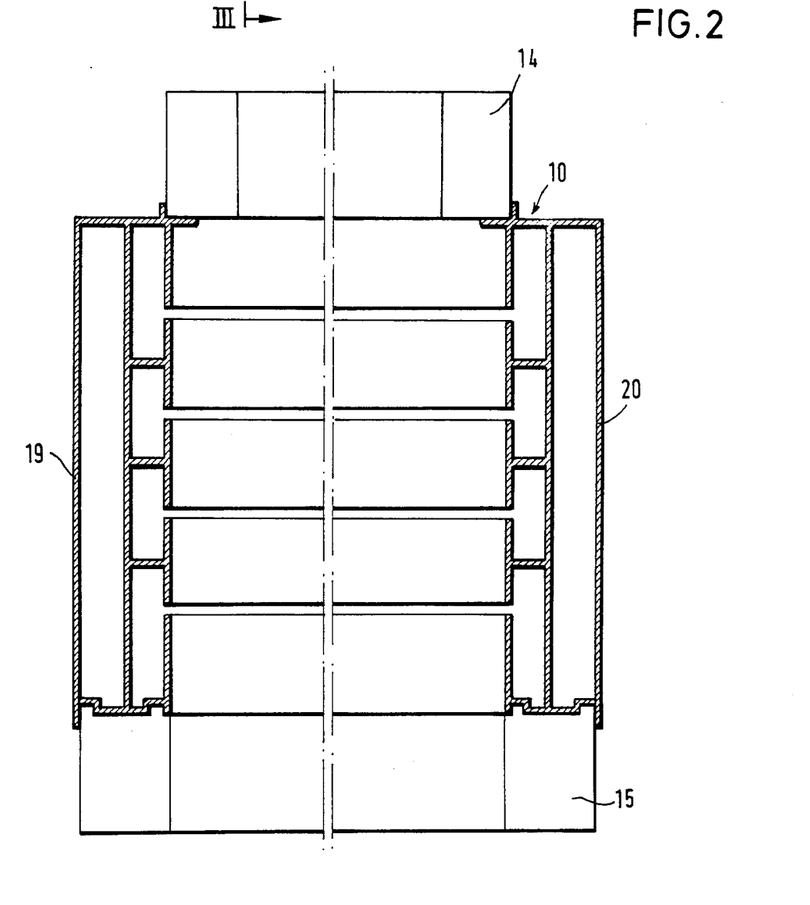
FIG. 2 is a schematic section along line II—II of FIG. 1.
Figure 3:
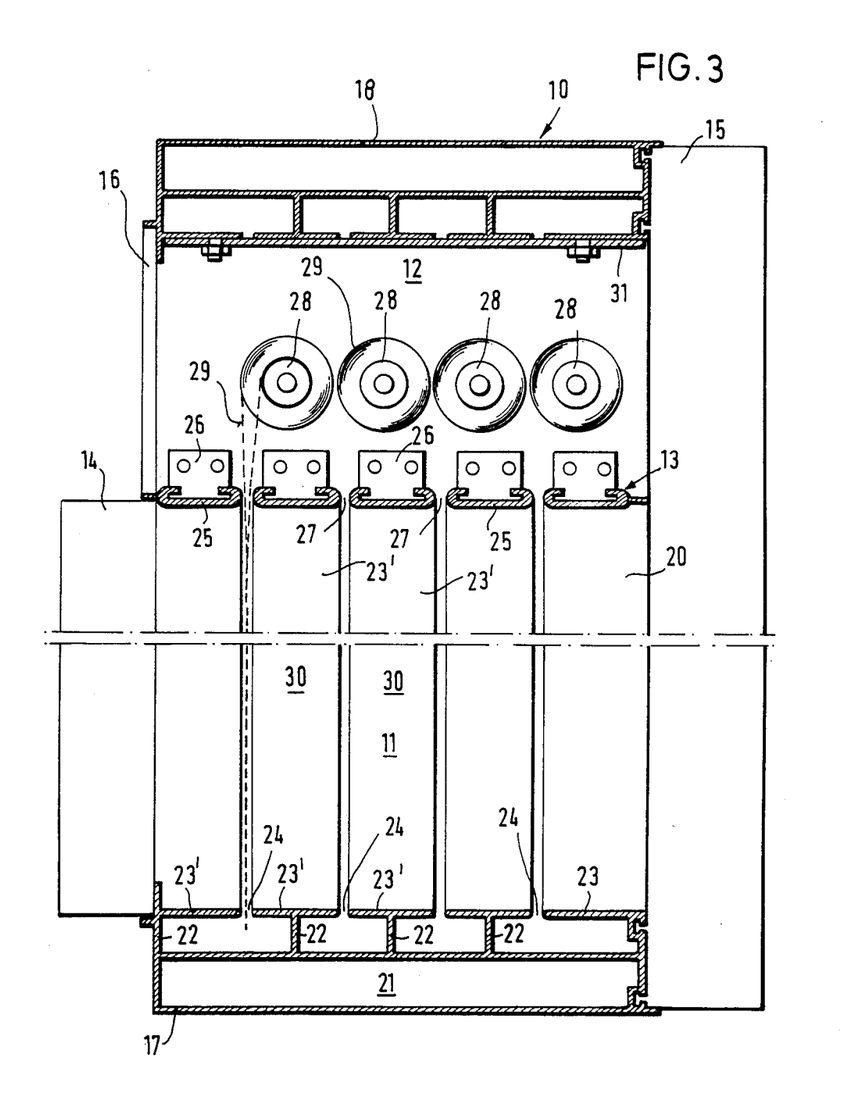
FIG. 3 is a schematic section along line III—III of FIG. 1.

FIGS. 1 to 3 show an embodiment comprising a rectangular installation frame 10 which fits into a wall opening of a building and which carries at least one outer window and the supporting structure for one heat insulating curtain. The installation frame 10 having a depth corresponding substantially to the thickness of the building wall is divided by an intermediate separating wall 13 into a window chamber 11 and an overlying auxiliary chamber 12. Facing frame 14 of an outer window is secured to the outside end of installation frame 10 and facing frame 15 of an inner window is secured to the inside end of the installation frame 10. Each of the facing frames 14 and 15 is placed against the front side of the installation frame to be connected thereto, with the interposition of suitable seals, by (non-illustrated) fixing means. Facing frames 14 and 15 consist of known window profiles. They contain casement frames adapted to be opened thus giving a direct access to the window chamber 11 from the building outside and inside through the opened window. In this embodiment, the facing frame 14 of the outer window only extends over the height of the window chamber 11 of the installation frame so that window chamber 11 only is closed to the outside by the external window, while the auxiliary chamber 12 is closed to the outside by a non-transparent shield 16 closely fitted at the installation frame 10. On the other hand, the inner window extends over the total height of the installation frame thus allowing not only the access to the window chamber 11 but also to the auxiliary chamber 12 when the wing of the inner window is opened.

The installation frame 10 consists of a bottom wall 17, a ceiling wall 18 and two side walls 19, 20 having the same width so that a box-shaped frame is formed with open main surfaces which are closed by the subsequently mounted inner and outer windows having each a wing to be opened, and by the facing 16 resp.

All of the walls 17 to 20 of the installation frame 10 consist of the same profile including a substantially rectangular box 21 extending over the total depth of the installation frame and forming the external wall portion. From the inner wall of the box 21 designed as a closed hollow profile, there extend stems 22 towards the frame inside to the inner wall 23 (FIG. 3), the inner wall 23 not being continuous but consisting of strip-shaped walls portions 23' provided in one common plane and supported each by one of the stems 22. Between the wall portions 23', there are slots 24. All of the walls 17 to 20 being of the same profile, a slot 24 of one of the walls is continued in all of the other walls thus resulting in a peripherally circumjacent slot inside the installation frame. The intermediate wall 13 extending in parallel to the bottom wall 17 and to the ceiling wall 18 comprises a series of C-profiles 25 being each as broad as the wall portions 23' and being secured to them by L-shaped holders 26. Between the C-profiles 25, slot-shaped passages 27 are provided for the curtain webs.

The auxiliary chamber 12 houses a plurality of rollers 28 supported pivotally with horizontal axles and having wound on them the curtain webs 29. All of the rollers 28 may be driven in common by a (non-illustrated) electric drive system thus permitting to wind on and off synchroneously all of the curtain webs 29. It is, however, also possible to perform an individual control of the curtain webs 29. The lateral edges of each curtain web are guided in slots 24 so that between two curtain webs 29 a closed air chamber 30 can be formed in the window chamber 11. The lower ends of the curtain webs 29 may be conducted through the slot 24 of the bottom wall 17 thus resulting in a closing of the air chambers 30 also at the bottom end. Within the region of the auxiliary chamber 12, the stems 22 and the wall portions 23' of the profile have been removed to enable the rolls 28 carrying the wound parts of the curtain webs 29 to extend between the box profiles 21 of the side walls 19 and 20.

Figure 4:
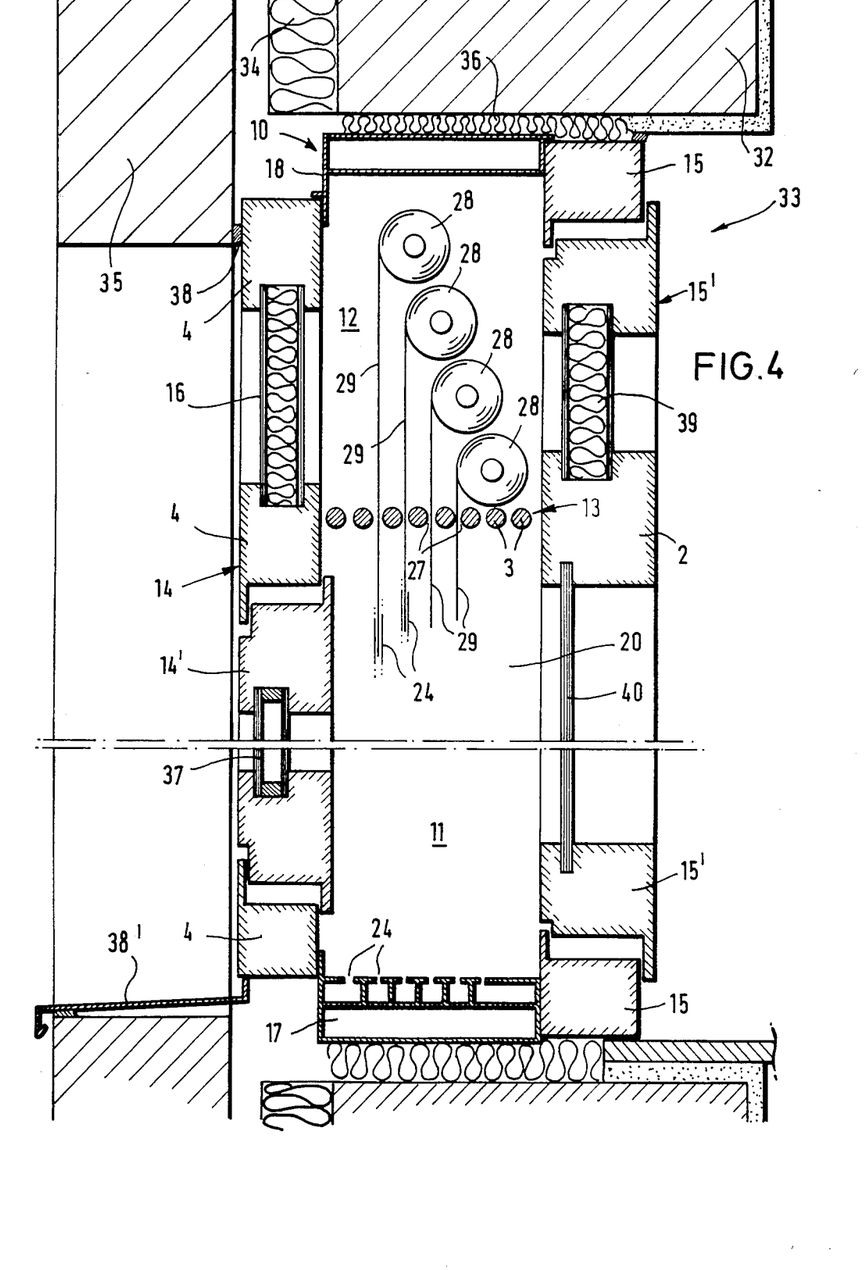
FIG. 4 is a vertical cross section of another embodiment of the heat insulating window.

The auxiliary chamber 12 disposed above the window chamber 11 also houses the control and drive elements of the rollers 28, said control and drive elements which are not illustrated, being secured to a support plate 31 that is mounted beneath the cealing wall 18. The embodiment of FIG. 4 shows the building wall 32 having a wall opening 33 to mount the installation frame 10. The outside of the wall 32 includes a heat insulating layer 34 in front of which, at a lateral distance, the outer skin 35 is applied in the form of a facing. The wall opening 33 is lined with another insulating layer 36 enclosing the installation frame 10 to the outside of which, the facing frame 14 is secured which extends over the height of the window frame 11 and over the height of the auxiliary chamber 12, said facing frame comprising in the height of the intermediate wall 13 a transverse bar 4. The facing frame 14 consists of a known profile which need not be explained in more detail. In the opening of the face frame 14, there is positioned a casement 14' which may be opened towards the window chamber 11 or towards the inside. To this effect, it is hinged at the facing frame 14. The casement 14' contains a window pane 37 made of insulating glass (double-glass) in the instant case. The field of the facing frame 14 disposed above the transverse bar 4 contains a non-transparent shield 16 closing externally the auxiliary chamber 12. As evident from FIG. 4, the outer skin 35 covers the upper edge of the facing frame 14 placed from the inside against the outer skin 35 by means of an interposed seal 38. Between the lower end of the facing frame 14 and the outer skin 35, there is provided a window sill 38'.

The rollers 28 carrying the curtain webs 29 are staggered in height within the installation frame 10, one roller each being positioned obliquely above the subjacently arranged roller. Thus, the distances of the slots 24 and of the curtain webs 29 may be reduced, and the depth of the installation frame 10 is inferior to the depth of the wall 32 accordingly. Towards the building inside, at the installation frame 10, there is mounted a facing frame 15 to secure thereto a casement 15' which may be tilted open towards the building inside and which comprises a transverse bar 151 at the height of the intermediate wall 13. The field of the casement 15' which closes the auxiliary chamber 12 contains a non-transparent screen 39 and the field of the casement 15' that closes the window chamber 16 of the installation frame 10 contains a glass pane 40. Thus, the window chamber 11 as well as the auxiliary chamber 12 are accessible if the casement 15' is opened.

According to the embodiment of FIG. 4, the intermediate wall 13 comprises individual round bars 3 extending between the side walls 19 and 20 of the installation frame 10 to form between them the slots 27 for the passage of the curtain webs 29 are formed.

Figures 5, 6:
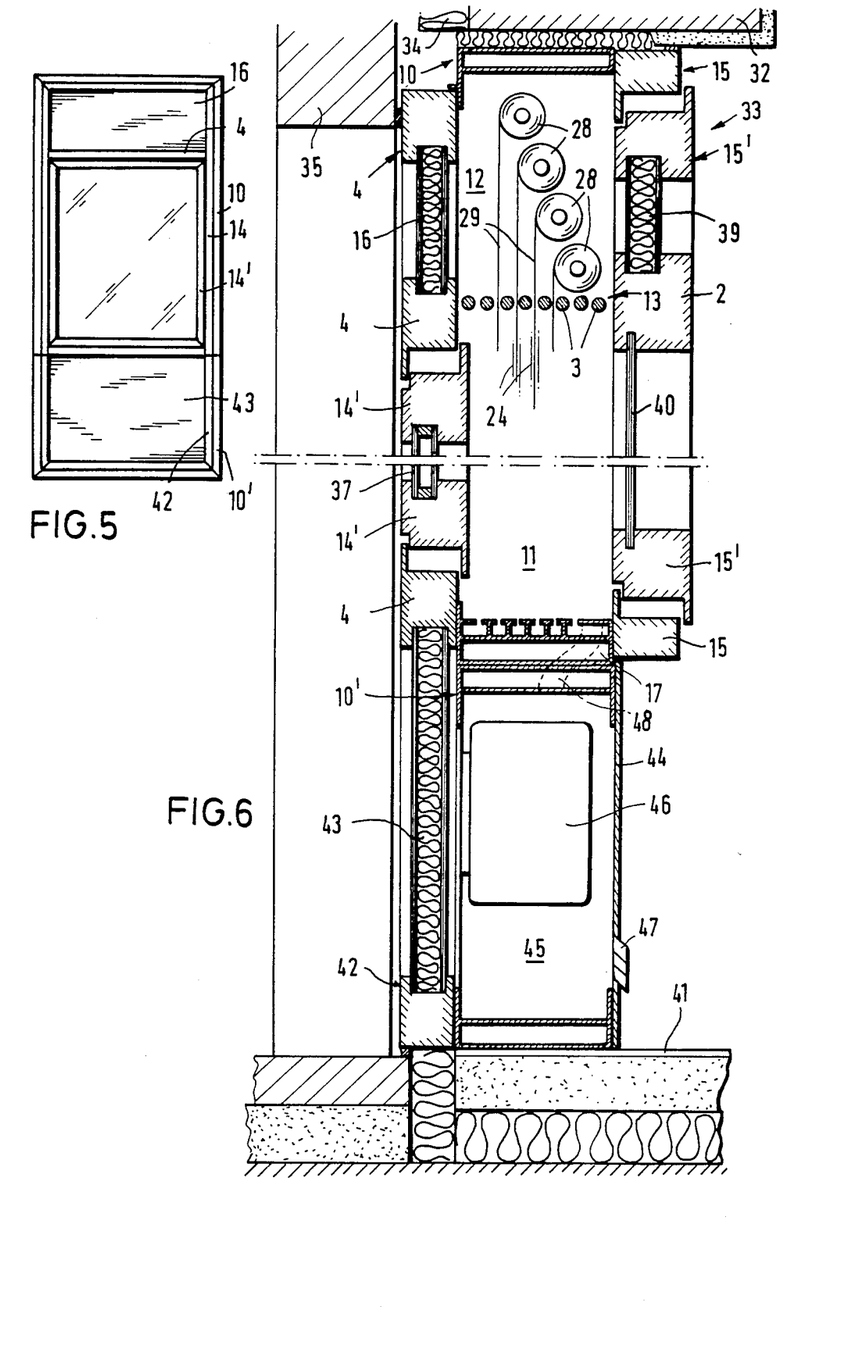
FIG. 5 is an external view of a heat insulating window extending down to the bottom.
FIG. 6 is a vertical section of FIG. 5.

The embodiment of FIGS. 5 and 6 correspond to a far degree to that of FIG. 4 so that only the differences will be explained hereunder. The wall opening 33 extends as far as to the floor 41 of the space, the installation frame 10 being extended downwardly by an additional frame element 10' having the same depth. In front of the lower frame portion 10', a facing frame 42 affixed firmly to the installation frame 10,10' contains a solid screen 43. Towards the building inside, the frame element 10' of the installation frame 10,10' is closed by an additional shield 44. The space 45 of the frame element 10' houses for inst. an air conditioner 46 including e.g. an air humidifier, electric drives, conduits, control means or other units.

The space 45 may also comprise an air inlet port communicating with the inside building room and intended to absorb cold room air which when heated, is either recycled into the room or which, for heating purposes, is first supplied to the window chamber 11 to be subsequently conducted again into the inner room of the building space.

Facing 44 contains an aperture 47 intended to connect the building room with the space 45 so that air may get from the building room to the air conditioner 46. Thus, it is possible to obtain a decentralised room ventilation with heat recovery for a flat. From space 45, a channel 48 extends into the window space 11 thus permitting to use the sheet webs 29 also as solar collector heating air.

Figure 7:
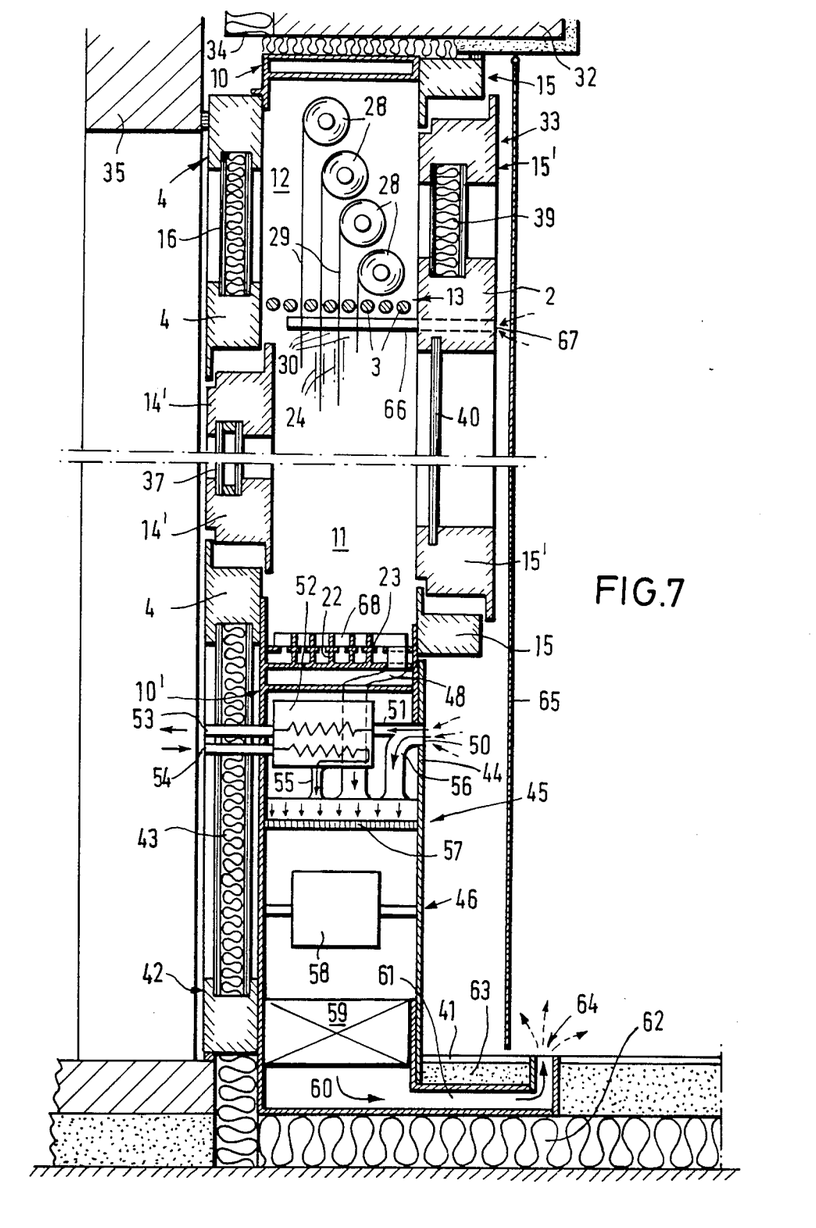
FIG. 7 is another embodiment with an air conditioner.

In the embodiment of FIG. 7, a slot-shaped air entry aperture 50 extending over the total facing width is provided in the facing 44 at the upper end of space 45. The room air absorbed accordingly shall be circulated, cleaned, partly exchanged against fresh air and heated or cooled. If necessary, one may provide additionally an air humidifier not shown in FIG. 7, but mentioned already before. The room air current absorbed by the air entry aperture 50 is introduced into a main channel 56 having a cross section substantially adapted to the rectangular air entry aperture 50 and from which a branch 51 guides a partial air current into a spent air/fresh air heat exchanger 52 which, to the extent of waste air evacuated through a conduit 53, absorbs fresh air through line 54 which fresh air is heated in countercurrent to the spent air. The spent air/fresh air heat exchanger 52 comprises blower units not shown in FIG. 7 which convey each a uniform air volume current.

The partial air current branched off to exchange thereagainst fresh air may be adjusted via a controller that can be operated at facing 44 and, upon demand, it may be disconnected completely. Due to the heat exchanger, a constant fresh air supply is ensured also in winter without excessive heat losses involved therewith.

The heated fresh air flows through line 77 off the heat exchanger and, together with the room air supplied through the main channel 56, it is conveyed into a cavity above an air filter 57 to be mixed there with room air. Alternatively, line 55 may be provided in such a way that, by avoiding the air filter 57 and a blower unit 58, fresh air is led directly to a heating means 59 to be mixed only there with room air.

In addition to line 55, and to the main channel 56, channel 48 extending into the window chamber 11 may be adapted to optionally end in the cavity ahead of the air filter 57 thus permitting to absorb from the window chamber 11 serving as an air collector, the air heated by solar radiation to use it for heating the room air. To absorb the air heated in the window chamber 11 by solar radiation, a transverse bar 2 within the window range contains a bore for the supply of fresh air, said bore connecting the building space with the window chamber 11. Adjacent to the bore 67, a channel 66 mounted at the side wall 20 extends into the window chamber 11, said channel 66 being mounted at the one lateral edge of the curtain web 29 at right angles thereto and directly beneath the intermediate wall 13, and it being fitted with one or more apertures which are directed to the air chambers 30 of the curtain web 29 to immediately replace from the building space air absorbed via channel 48 at the lower end of the curtain web.

At the lower end of curtain webs 29, the air chambers 30 are exhausted through another channel 68 substantially corresponding to channel 66, the heated air being supplied to channel 48. Channel 68 is secured to the side wall 20 at the height of the inner wall 23, its apertures for absorbing the air being directed to the air chambers 30. At the same time, the stems 22 extend upwardly beyond the inner wall 23. At the building space side end of channel 68, there is adjoined channel 48 which may be closed for insts. by a throttle flap adjustable at the facing 44 thus permitting to connect, subject to the prevailing demand, hot air absorption in window space 11 to conduct it to the air filter 57.

The air filter 57 is for inst. composed of a non-woven fabric mat supported on an extractable wire screen and extending in parallel to the ground over the total width and depth of space 45 to obtain a low current speed towards the filter. The room air to be circulated is continuously cleaned by the air filter 57 thus ensuring that the amount of air dust depositing on furniture in the building room is considerably reduced.

Beneath the air filter 57, there is produced low pressure at the air filter 57 and also at the air entry opening 50 as well as at channel 48 by means of a blower unit 58, e.g. a radial ventilator. After having passed the air filter 57, room air liberated from dust particles gets into the suck side of the blower unit 58 to be conveyed into a heating means 59, e.g. a convector being effective substantially responsive to the intensity of the convection current. Therefore, the blower unit 58 is controlled thermostatically via a room thermostat allowing a favorable individual temperature control for each room in association with the air conditioner. It is possible to connect the convector 59 to a conventional hot water heating system or, for cooling, it may be operated with an undercooled medium. As compared to conventional radiators, convector 59 does not suffer from substantial radiation losses. To adjust the delivered heating or cooling power output, no control valves probably causing flow noises are required because control is effected by the speed of the blower unit. To increase the heating surface available in space 45, the convector may be mounted to be inclined about its longitudinal axis.

It is possible to provide a heating as well as a cooling means, the air duct of the room air conveyed with the blower unit 58 being realised selectively, for inst. via the cooling means in summer and via the heating means in winter. In place of convector 59, one may provide an electrically operated heating or cooling means thus doing away with installation connections for the heat or cooling agent.

After having passed convector 59, the room air gets into a square channel 60 mounted beneath convector 59 and extending over the total width and depth of the installation frame 10'. At the building space side, it is adjoined by a horizontally extending square shaped channel portion 61 that is led into the building room. Said channel portion 61 extends beneath the floor and nearly over the total width of the installation frame 10'.

Preferably, it is arranged between an insulation layer 62 of the floor construction and the floor finish 63. At the end of the horizontal channel section 61, a slotted air exit opening 64 directed vertically upward also extends over the total width of the installation frame 10'. The circulated, cleaned and heated or cooled room air is recycled at a low flow rate through said opening 64. Suitably, said exit aperture 64 is provided with a walkable grate. The horizontal channel portion extends into the room as far as to cause an advanced positioning of the air entry opening 64. Seen from the building space, with a curtain 65 normally provided in front of the window, the return air may freely flow ahead of the curtain 65 inside the building at the lowermost point. Thus, no heat cushion increasing heat loss at the window surfaces may be formed between the curtain 65 and the window as in the conventional room heating systems with heating bodies beneath the window, but a cool air cushion hardly circulating and having a strongly insulating effect is formed between window and curtain 65, the respective heat loss at the window being considerably reduced accordingly. On the other hand, seen from the building space, there is formed in front of curtain 65 a warm air current which may flow upward to freely circulate in the building. The unimpeded air circulation permits a quick adaptation to temperature fluctuations. Th air flowing through the curtains not containing heated dust particles, the risk of dirtying of the curtains is also reduced to a minimum.

If, due to restricted space, convector 59 may not be provided in room 45, it may be mounted directly beneath the air exit aperture 64.

Advantageously, shield 44 is detachable so that all installation units are freely accessible in room 45. This is for inst. important for the filter exchange. In the heating period, the heat carrier medium of the heating system may freely flow continuously through the convector.

Heat consumption is adjusted by means of the blower unit 58 through a thermostat. Even with a standstill of the blower unit due to control work, a residual heating of about 10% of the maximum heating capacity is left which may serve to additionally heat the amount of fresh air which may be kept on flowing through the air conditioner 46 also with a standstill of the blower unit 58, on account of the independent blower units in the heat exchanger 52.

In summer, on the other hand, the cooling medium may constantly flow through the cooling device, the cooling capacity depending substantially upon the room air circulating rate. With a standstill of the blower unit 58, the residual cooling will be sufficient for cooling the fresh air amount.

The advantages of the disclosed air conditioner reside in the low installation cost, in the quick adjustability of heating or cooling power and in the possible adaptation to day and night conditions, to radiation intense meteorological situations, to covered sky conditions and to the individual climatic adjustment for each building room.

The disclosed air conditioner also ensures a fresh air supply without the usual disadvantages of cool air action in cold seasons and without any draft phenomina.

Contrary to the conventional radiators, the disclosed air conditioner is space-saving and very advantageous in connection with the heat-insulating window in that during the heating period, air heated by solar radiation is used from the window space 11 for heating purposes.

In the field of reconstruction of old buildings, the disclosed air conditioner can be easily supplemented, and in cases in which the channel portion 61 cannot be provided in floor 41, the air exit aperture 64 may be provided directly in skirting height.

Air conditioner 46 is mounted in a substantially L-shaped modular housing that may be fixed by simple means in an installation frame 10'. Thus, with the construction of the building, only the installation frame 10,10' need be provided first of all e.g. for a heat insulting window with air conditioner 46, while the decision concerning the individual units of the air conditioner 46 or concerning the types of window need be only made at a later time.

Due to the common installation frame 10,10', it is possible to realise the simple combination of the heat insulating window with an air conditioner 46 so that with solar radiation, the window may be used as an air collector.

The air conditioner 46 may be also mounted in an installation frame 10' surrounding only the vertical portion of the L-shaped housing if no windows are provided at the respective wall.

Figure 8:
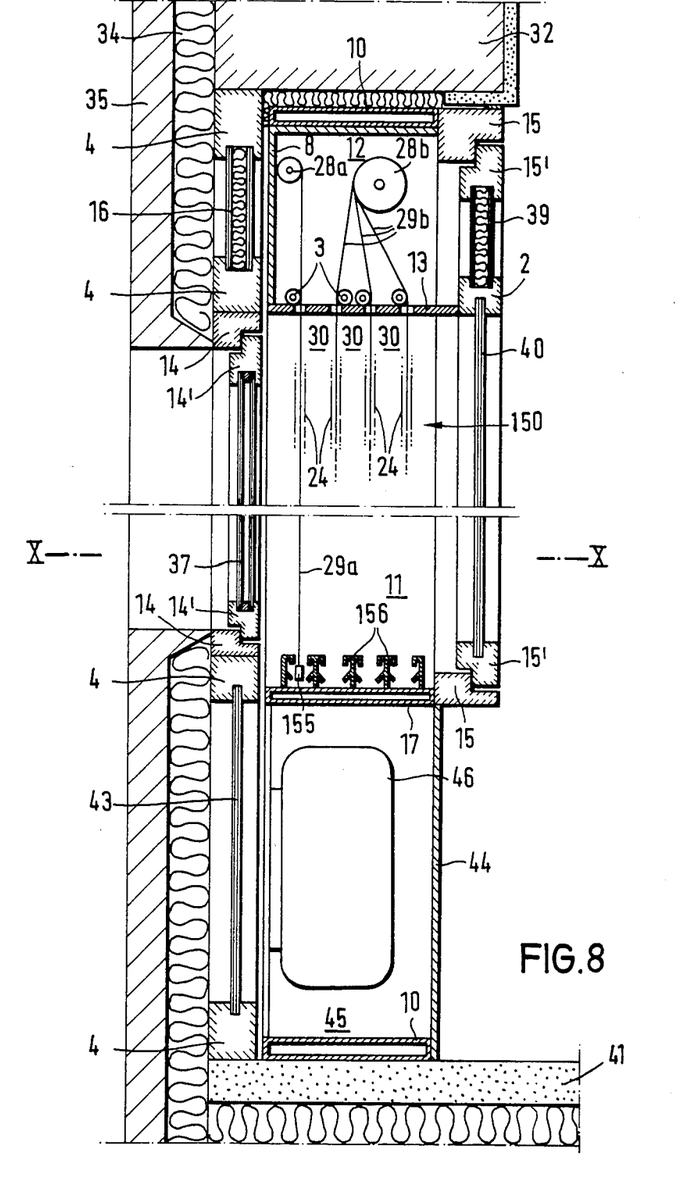
FIG. 8 is a vertical cross section of an embodiment of the heat insulating window.

The heat insulating window of FIG. 8 comprises a rectangular and frame shaped block case 1 which occupies the wall opening. The block case 1 illustrated in FIG. 9 encompasses the window hole and the solid screen 43 provided under the latter.

Figure 9:
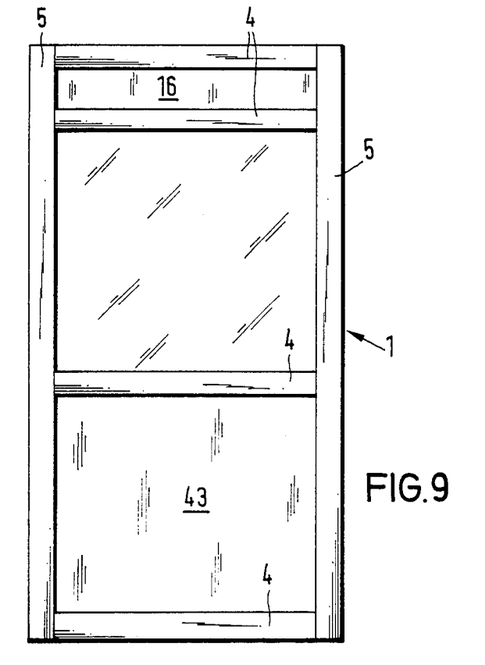
FIG. 9 is a schematic view of a prefabricated block case seen from the outside of the building.
Figure 10:
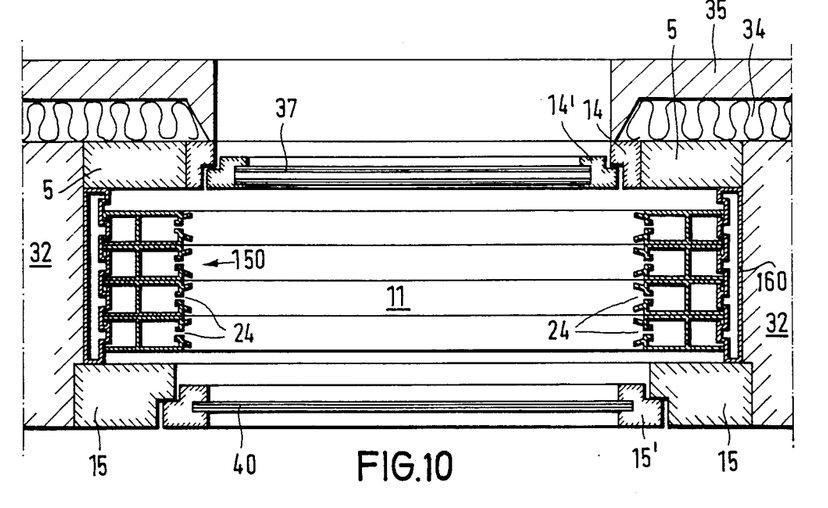
FIG. 10 is a schematic cross section along line X—X of FIG. 8.

Upon the laying of the floor 41 or of an intermediate ceiling in a new building, the block case 1 is fitted at a point as marked in the construction plan, and fixed provisionally. Subsequently, the outer building wall 32 is bricked up directly at the lateral outer edges of the block case 1 by hardly leaving a joint between the latter and the external wall 32. Preferably, the block case is flush with the external wall plane. In front of the external wall 32, one may provide the heat insulation layer 34 and an outer screen brickwork skin 35 which extend continously within the range of the screen 43 and in the upper region of the block case 1.

Advantageously, the block case 1 comprises rectangular, square or profiled wooden rails 5 and horizontal transverse bars 2,4. However, it may consist as well of a plastic or metallic profile. A horizontal transverse bar 4 provided at the lower end of the window hole and forming the end of the parapet element or screen 43 extends between the vertical rails 5, the parapet element 43 consisting e.g. of a mold-glued hardboard with insulation or of a plastic element. It may contain air exchange openings for the heat exchanger 52 to be mounted behind the parapet element 43. The parepet element side facing the building inside may be coated with a reflective foil to improve heat insulation.

At the external end of the block case 1, there is provided at the inner peripheral edge of the window hole being enclosed by rails 5 and transverse bars 4 a circumjacent recess for receiving the facing fgrame 14 of an external window, the facing frame 14 being placed agailnst the end side of the block case 1 and being connected to the block case 1 by (non-illustrated) fixing means with the interposition of suitable seals. The fixing means used may be for inst. a groove- and spring connection of the facing frame 14 with the block case 1 so as to improve the thermal sealing between block case 1 and facing frame 14. The latter may consist of known window profiles. It contains a casement which, preferably, may be opened to the inside thus ensuring by the open window a direct access to the window chamber 11 from the building outside and inside.

Figure 11:
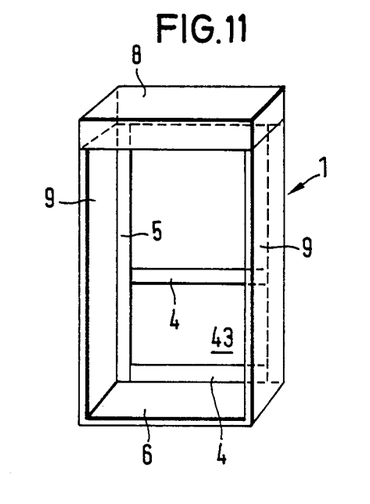
FIG. 11 is a perspective view of another embodiment of a block case with side walls and incorporated box from the inside of the building.

As obvious from FIG. 11, from the vertical rails 5 and the horizontal transverse bars, side walls 9 as well as roof and floor walls 6,7 may project towards the building inside and in flush with the outer edge of the block case 1 so that they flush with the inside of the external wall 32. A complete bricking around the block case 1 is possible by the side-, roof and bottom walls without the need of plastering the end faces of the external wall 32 forming the wall opening.

Upon the incorporation of the block case 1, the total raw construction including the plaster works may be terminated before additional elements of the heat insulating window are mounted.

According to FIG. 9, the upper end and the lower end of the block case 1 are closed by another transverse bar 4, which may be also replaced by a box 8 as shown in FIG. 11 to receive rollers for a shutter or a screen for heat insulating curtains. Said boy 8 may be open either towards the building inside or towards the window chamber 11 so as to permit a later mounting of curtain webs 29. The depth of the box is preferably adapted to the thickness of the outer wall 32. The auxiliary chamber 12 is closed to the outside by a facing 16 fixed at the block case 1. The external insulation 34 and the screen brickwork 35 extend continuously along the block case 1 in the height of the auxiliary chamber 12.

Box 8 contains a first roller 28a on which for inst. a curtain 29a protecting against sight or solar radiation may be wound, and a second roller 28b on which a pourality of heat insulating curtain webs 29 are wound. The rollers pivoted in box 8 by means of horizontal axles may be driven by a (non-illustrated) electric mechanism allowing to wind up or unwind all of the curtain webs 29a,29b. However, the curtain webs 29a,29b may be also controlled individually. Preferably, they consist of transparent sheets involving a low loss of light, and which divide in the heating period, also by day, the window chamber 11 into several air chambers. The curtain webs which are broader than the facing frame of the external window do not only improve the heat insulation of the window but also that of the facing frame. In addition to the curtain webs 29b of transparent sheets, a sunscreen sheet may be unwound by day which serves as a reflective sheet by neight, if it is coated bilaterally with a reflective layer. The curtain webs 29a,29b are guided by a horizontal intermediate partition wall 13 which forms the lower horizontal end of box 8, and which comprises slotted passages for the individual curtain webs 29a, 29b. Said partition wall with the curtain webs 29a,29b wound on the rollers 28a,28b may be inserted from the front into the box as a modular insert. To this effect, the rollers 28a, 28b are stored in (non-illustrated) vertical walls projecting upwardly from the partition wall. However, box 8 may be also open only at the bottom thus allowing to mount from below the modular insert.

The lateral edges of each of the curtain webs 29a, 29b are guided in slots 24 which extend in guide profiles 150 thus forming a closed air chamber 30 in the window chamber between two curtain webs 29a, 29b.

The guide profiles 150 which are mounted at the lateral end faces of the outer wall 32 are either fixed at the block case end face directed to the building inside or at the block case and at the end faces of the outer wall. According to FIG. 11, the guide profiles are secured to the side walls 9.

Figure 12:
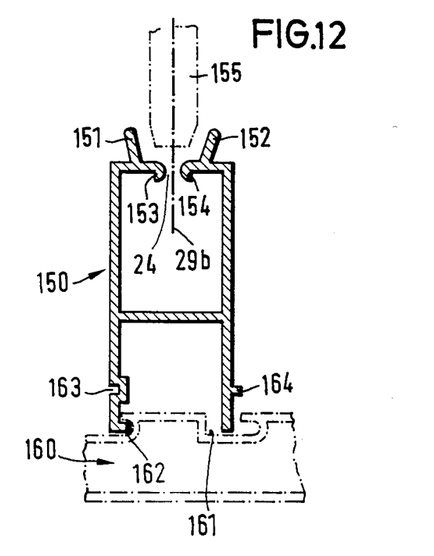
FIG. 12 is a lateral guide profile for curtain webs.

The guide profiles are composed of box-shaped hollow members capable of being interconnected in a plug-type system so that in conformity with the number of curtain webs, a plurality of slots 24 may be juxtaposed in spaced relationship. The pack of profiles may be easily mounted in common.

At both sides of the slots 24, the guide profiles contain a rail 151,152 obliquely projecting from the slot and forming in common a substantially V-shaped guidance for loading rails applied at the ends of the curtain webs. The width of the loading rails 155 is adapted to the free space between the guide profiles 150 arranged at both sides of the window opening, while the curtain webs themselves enter through the slots 24 and into the cavity of the guide profiles. The laterally projecting edge not ending with the loading rail may be provided with a reinforcement serving as a protection against kinking.

Alternatively, the guide profiles 150 may be of a wooden profile in which slots for receiving the loading rails 155 respectively the laterally projecting edges of the curtain webs are provided.

Figure 13:
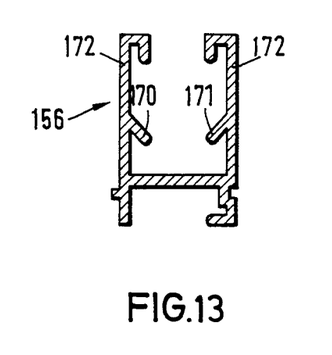
FIG. 13 is an end profile for curtain webs and FIG. 14 is another embodiment of an end profile.

Further, the inner slot aperture edges situated inside the hollow profile are provided with stems 153,154 bent outwardly from the slot and ensuring a correct sliding of the curtain webs 29a,29b in the slots. The lower horizontal end of the window chamber 11 is formed by the end profiles 156 corresponding substantially to the lateral vertical guide profiles and sealingly receiving the ends of the curtain webs 29a,29b which, as mentioned before, are fitted with loading rails 155 in which the final or end profiles 156 secured to the transverse bar 4 of the block case disappear. They may be also fixed at the lateral guide profiles 150 with which they form a U-shaped frame.

The slots 24 of the box-shaped end profiles 156 which may be also combined by a plug system and which enable the loading rails to disappear, are as deep as to permit a certain length compensation of the curtain webs 29a,29b.

The slot edges of the end profiles are bent inwardly. Inside the hollow profile, two oblique rails 170,171 pointing downwardly are projecting from the vertical walls 172 of the end profiles 156 to inhibit the air exchange between adjacent air chambers 30, on the one hand, and to guide the loading rails 155, on the other hand so that they cannot be hooked in the end profiles.

Figure 14:
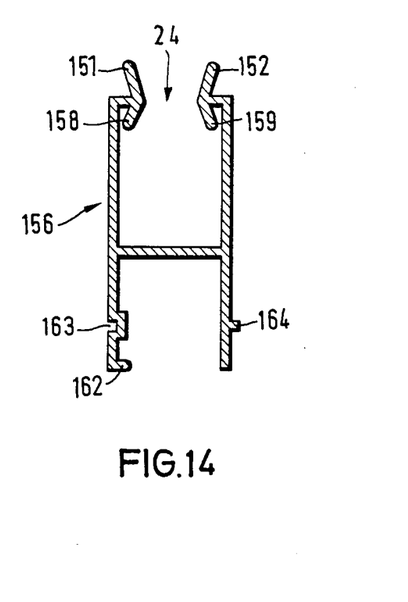

FIG. 14 shows another embodiment of an end profile 156 comprising rails 151,152 projecting in a substantially V-shaped manner from the slot to the outside, the profile corresponding substantially to the lateral guide profile 150, except for the fact that for the passage of the loading rails, slot 24 is flared as far as to the projecting rails 151,152 which are ment to introduce the loading rails into the slots 24. Inside the end profile and mirror-inverted to the projecting rails 151,152, there are arranged two additional rails 158,159 to avoid hooking of the loading rails in the end profile when the curtains are wound up.

To obtain a modular unit comprising all of the elements of the heat-insulating window except for the block case 1 and the external window and allowing the subsequent mounting, there is provided an installation frame 10 as illustrated in FIG. 8 the external dimensions of which are substantially the same as that of block case 1 and whose frame profile 160 is preferably hollow. The installation frame 10 placed against the block case front side facing the building is connected to the block case 1 and/or to the lateral front face of the outer wall 32 by interposing suitable seals and by using suitable (non-illustrated) fixing means. If the block case 1 comprises side walls 9, roof or bottom walls 6,7, the external dimensions of the installation frame 10 are reduced respectively thus permitting to insert the installation frame in the block case 1 and to connect it to the side walls 9 and/or to the block case 1.

The installation frame 10 consists of a bottom wall 17, a ceiling wall 18 and two side walls 19,20 having the same width each, so that a box-shaped frame is formed having open main surfaces which are closed to the inside of the building by the inner window 40 or by a facing 44 in the parapet region.

All of the walls 17 to 20 of the installation frame 10 consists of the same profile which includes a substantially rectangular box 21 extending over the total width of the installation frame and forming the outer part of the modular constructional unit.

Preferably, the lateral vertical guide profiles 150 and the horizontal end profiles 156 are plugged with the frame profile of the installation frame 10. As evident from FIG. 12, a lateral guide profile is in positive plug connection with the frame profile of the installation frame 10. At its face directed to the window opening, the frame profile 160 contains a number of grooves 161 having one undercut flank. Said undercut portion is engaged by a nose 162 of the plug-type guide and end profiles which nose extends in parallel to the bottom of the grooves and frome one outer wall of the profiles. Furthermore, the respective outer wall with the nose 162 comprises a longitudinal recess 163 while the respective other outer wall contains a corresponding longitudinal projection 164. When the profiles are assembled with the frame profile 160, the projections 164 engage the recesses 163 of adjacent profiles thus permitting to retain in common adjacent outer walls of profiles by means of nose 162 in the undercut groove 161 of the frame profile 160.

The two lateral vertically extending guide profiles and the end profiles surround the window chamber 11 in a U-shaped manner without constricting the free window opening so that the incident light is not affected by the heat-insulating window.

The frame profile of the installation frame may contain openings to connect installations and cables.

Preferably, the prefabricated, accurately dimensioned installation frame is completely equipped in a manufacturing plant to comprise the desired window elements and the installation for the air conditioning of the apartments to be provided in the auxiliary chamber. Thus, as a complete construction unit, it is mounted at the block case 1 in the end state of a building schedule.

The unit may be realised by a conveyer-like system so that the production can be rationalised considerably. The expensive individual assembly of single window elements at the building site will become unnecessary accordingly.

Towards the building inside, the window chamber 11 is closed by the building window which is larger than the external window and which is secured to the installation frame 10 by means of a facing frame 15. By the internal window larger in size than the external window, light recovery of the heat-insulated window is increased, the guide profiles 150 and the final profiles 156 remaining covered by the facing frame 15 of the internal window thus not projecting into the window opening. Alternatively, the facing frame 15 may be fastened at the outer wall 32.

The internal window extends as far as to the upper edge of the block case 1 thus allowing access not only to the window chamber 11, but also to the auxiliary chamber 12 if the wing of the internal window is opened. In this connection, the auxiliary chamber 12 is closed by a non-transparent shield 39 extending between the upper end of the wing 15' and a transverse bar 2.

If the upper end of the block case is already provided with a box 8 which may be open only to the bottom, the upper edge of the facing frame 15 will end at box 8.

The heat-insulation coefficient of the heat-insulating window within the range of the auxiliary chamber 12, of the auxiliary chamber 45 and of the window chamber 11 is greatly in conformity to that of the total outer brickwork, thus ensuring an engineering-physical optimization of the outer facing. In particular no condensate may form in the window chamber 11 and at the facing frame in the window chamber.

What is claimed is:
1. A heat-insulating window for closing window openings in buildings which comprises
an installation frame adapted to be incorporated into a wall structure of a building, said installation frame containing means for mounting profiles containing lateral guide slots which extend vertically for engaging the borders of curtain webs, said profiles being mounted so that the curtain webs laterally extend beyond the window opening,
an outer facing frame adapted to be secured to the outer side of the installation frame and defining a window opening,
an inner facing frame adapted to be secured to the inner side of the installation frame and containing a removable auxiliary frame, said outer facing frame and said inner facing frame defining a first auxiliary chamber and a window chamber disposed therebetween, said auxiliary chamber being disposeed above said window chamber and separated therefrom by an intermediate wall which contains slots for the passage of curtain webs therethrough,
at least one glass pane disposed in said window opening in front of said window chamber, and
roller means containing curtain webs disposed in said auxiliary chamber, said curtain webs being extendable across said auxiliary chamber, through the slots in said intermediate wall and across said window chamber.

2. The heat-insulating window of claim 1 wherein an additional installation frame provided with an additional outer frame and an inner facing shield is disposed in the wall structure, said additional outer frame and said inner facing shield defining a second auxiliary chamber disposed therebetween and below said window chamber, and an airconditioner with associated control instruments disposed within said second auxiliary chamber.

3. The heat-insulating window of claim 2 wherein heat exchange means is disposed within said second auxiliary chamber for providing heat exchanges between the room air and the fresh air.

4. The heat-insulating window of claim 3 wherein blower means, the airconditioner means and the heater means are disposed below said heat exchange means, and air filter means is disposed between said heat exchange means and said blower means, airconditioner means and heater means.

5. The heat-insulating window of claim 4 wherein channel means is disposed at the bottom of said second auxiliary chamber, said channel means providing communication between said second auxiliary chamber and the room.

6. The heat-insulating window of claim 5 wherein conduit means provides communication between said window chamber and said second auxiliary chamber.

7. The heat-insulating window according to claim 1, wherein the window chamber (11) is limited towards the building inside by at least one additional glass pane (40) mounted in the auxiliary frame.

8. The heat-insulating window according to claim 1, wherein said inner facing frame (15) and said auxiliary frame extend over the height of the window chamber (11) and the auxiliary chamber (12).

9. The heat-insulating window according to claim 8, wherein the auxiliary frame (15') contains a non-transparent shield (39) within the area of the auxiliary chamber (12).

10. The heat-insulating window according to claim 1, wherein the installation frame (10) contains means for mounting profiles containing bottom slots (24) for engaging the lower edges of the curtain webs (29).

11. The heat-insulating window according to claim 1, wherein another auxiliary chamber (45) is disposed beneath the window chamber (11) and adapted to house air conditioners, and control instruments.

12. The heat-insulating window according to claim 11, wherein said other auxiliary chamber (45) is in free-venting communication with the window chamber (11).

* * * * *